United States Patent
Jalloul et al.

(10) Patent No.: US 7,251,497 B2
(45) Date of Patent: Jul. 31, 2007

(54) SIGNAL-TO-INTERFERENCE RATIO ESTIMATION FOR CDMA

(75) Inventors: Louay Jalloul, San Jose, CA (US); Michael Kohlmann, San Francisco, CA (US); Joel D. Medlock, Campbell, CA (US)

(73) Assignee: Infineon Technologies AG (DE)

( * ) Notice: Subject to any disclaimer, the term of this patent is extended or adjusted under 35 U.S.C. 154(b) by 557 days.

(21) Appl. No.: 10/750,924

(22) Filed: Dec. 31, 2003

(65) Prior Publication Data

US 2005/0143117 A1  Jun. 30, 2005

(51) Int. Cl.
*H04B 7/00* (2006.01)

(52) U.S. Cl. .............. 455/522; 455/69; 455/67.11; 455/67.13; 455/226.1; 455/226.2; 455/226.3

(58) Field of Classification Search ............ 455/522, 455/68, 69, 296, 135, 226.3, 277.2
See application file for complete search history.

(56) References Cited

U.S. PATENT DOCUMENTS

| | | | |
|---|---|---|---|
| 6,320,915 B1 * | 11/2001 | Stott et al. ............... | 375/340 |
| 6,370,130 B1 * | 4/2002 | Zhou et al. ............... | 370/335 |
| 6,865,218 B1 * | 3/2005 | Sourour .................. | 375/148 |
| 2001/0019577 A1 * | 9/2001 | Ha ........................ | 375/148 |
| 2003/0031195 A1 * | 2/2003 | Okawa et al. ............ | 370/441 |
| 2004/0093178 A1 * | 5/2004 | Shin et al. ............... | 702/69 |
| 2004/0127213 A1 * | 7/2004 | Hwang ................... | 455/423 |
| 2004/0266469 A1 * | 12/2004 | Hayashi et al. .......... | 455/522 |
| 2005/0037712 A1 * | 2/2005 | Rainbolt et al. ......... | 455/67.11 |
| 2005/0075122 A1 * | 4/2005 | Lindoff et al. .......... | 455/522 |

OTHER PUBLICATIONS

Jalloul L M A et al.; "SIR estimation and closed-loop power control for 3G"; Vehicular Technology Conference, 2003. VTC 2003-Fall, 2003 IEEE 58th Orlando, Fl, USA Oct. 6-9, 2003, Piscataway, NJ, USA, IEEE, Oct. 6, 2003, pp. 831-835, vol. 2, XP010700836.
Ramakrishna et al., Subspace-Based SIR Estimation for CDMA Cellular Systems, IEEE Transactions on Vehicular Technology, Sep. 2000; 49(5):1732-1742.
Pauluzzi et al., A Comparison of SNR Estimation Techniques for the AWGN Channel., IEEE Transactions on Communications, Oct. 2000; 48(10):1681-1691.
Seo et al., SIR-Based Transmit Power Control of Reverse Link for Coherent DS-CDMA Mobile Radio, IEICE Trans. Commun., Jul. 1998; vol. E81-B, No. 7, pp. 1508-1516.
3 GPP TS 25.215 V5.4.0 (Jun. 2003) $3^{rd}$ Generation Partnership Project; Technical Specification Group Radio Access Network; Physical layer—Measurements (FDD) (Release 5).
3 GPP TS 25.213 V5.3.0 (Jun. 2003) $3^{rd}$ Generation Partnership Project; Technical Specification Group Radio Access Network; Spreading and modulation (FDD) (Release 5).

* cited by examiner

*Primary Examiner*—Nay Maung
*Assistant Examiner*—Dominic E. Rego
(74) *Attorney, Agent, or Firm*—Dickstein, Shapiro, LLP.

(57) ABSTRACT

Calculating of signal-to-interference ratio (SIR) of a mobile device in a wireless communication system. A communication signal transmitted by the mobile device is non-coherently processed. Interference power of the communication signal is estimated and then scaled, and the scaled estimated interference power is subtracted from the processed communication signal to thereby estimate signal power. The SIR is calculated by dividing the estimated signal power by the estimated interference power.

30 Claims, 8 Drawing Sheets

Fig. 8

SIGNAL-TO-INTERFERENCE RATIO ESTIMATION FOR CDMA

FIELD OF THE INVENTION

This invention relates to code division multiple access (CDMA) for a communication system, and more particularly to signal-to-interference ratio estimation of CDMA signals using non-coherent processing.

BACKGROUND OF THE INVENTION

Many wireless communication systems require the knowledge of the receiver signal-to-noise (and interference) ratio (SIR). SIR estimates are typically used in closed-loop power control, handoff, adaptive coding and modulation, MAP decoding for Turbo codes, etc.

Numerous methods exist for measuring the interference power associated with a received signal. One approach uses the total received power (which is typically received signal strength indication (RSSI)) at the automatic gain control (AGC) output of the wireless communications device.

Another approach uses re-modulation of a de-spread signal using either perfect knowledge of the transmitted sequence or tentative decisions in order to subtract signal components and measure non-orthogonal interference.

Still other approaches use estimations in which partial derivatives are set to zero to arrive at a maximum likelihood (ML) estimation, or estimates of the signal-to-noise variance are calculated, second and fourth order moments of the received signal are used to solve for S (signal power) and I (interference power), or a signal-to-noise variance ratio is determined using a moments method combined with usage of delayed received symbols.

SUMMARY OF THE INVENTION

The present invention provides a method for calculating signal-to-interference ratio (SIR) in a wireless communication system. A communication signal transmitted by the mobile device is non-coherently processed. Interference power of the communication signal is estimated and scaled, and the scaled estimated interference power is subtracted from the processed communication signal to thereby estimate signal power. The SIR is calculated by dividing the estimated signal power by the estimated interference power.

The present invention also provides a wireless communication system having a base station and a mobile device. The system includes a method for adjusting power settings of the mobile device by calculating SIR of communication signals transmitted to the base station by the mobile device. SIR is calculated by non-coherently processing a communication signal transmitted by the mobile device, estimating interference power of the communication signal, scaling the estimated interference power, subtracting the scaled estimated interference power from the processed communication signal to thereby estimate signal power, and calculating the SIR by dividing the estimated signal power by the estimated interference power. The calculated SIR is compared with a target SIR to thereby generate a power control signal, which is transmitted from the base station to the mobile phone. This power control signal is then used to adjust the power of the communication signals transmitted by the mobile phone.

Further, the present invention provides a system for calculating SIR comprising a means for non-coherently processing a communication signal transmitted by the mobile device, means for estimating interference power of the communication signal, means for scaling the estimated interference power, means for subtracting the scaled estimated interference power from the processed communication signal to thereby estimate signal power, and means for calculating the SIR by dividing the estimated signal power by the estimated interference power.

The present invention also provides a wireless communication system, having a base station and a mobile device, for providing power control of communication signals transmitted by the mobile device. The system comprises a means for calculating SIR of the communication signals transmitted to the base station by the mobile device, a means for comparing the calculated SIR with a target SIR to thereby generate power control signals, a means for transmitting the power control signals from the base station to the mobile phone, and a means for adjusting power of the communication signals transmitted by the mobile phone based on the power control signals. The calculating means comprises a means for non-coherently processing a communication signal transmitted by the mobile device, means for estimating interference power of the communication signal, means for scaling the estimated interference power, means for subtracting the scaled estimated interference power from the processed communication signal to thereby estimate signal power, and means for calculating the SIR by dividing the estimated signal power by the estimated interference power.

Furthermore, the present invention provides a wireless communication system having a base station and a mobile device, a processor, a memory communicatively coupled to the processor, and software executing in the processor. The software is configured to non-coherently process a communication signal transmitted by the mobile device, store the processed communication signal in the memory, estimate interference power of the communication signal, store the estimated interference power in the memory, scale the estimated interference power, store the scaled estimated interference power, subtract the scaled estimated interference power from the processed communication signal to thereby estimate signal power, store the estimated signal power in the memory, and calculate the SIR by dividing the estimated signal power by the estimated interference power.

Moreover, the present invention provides a wireless communication system having a base station and a mobile device, a processor, a memory communicatively coupled to the processor, and software executing in the processor. The software is configured to non-coherently process a communication signal transmitted by the mobile device, store the processed communication signal in the memory, estimate interference power of the communication signal, store the estimated interference power in the memory, scaled the estimated interference power, store the scaled estimated interference power, subtract the scaled estimated interference power from the processed communication signal to thereby estimate signal power, store the estimated signal power in the memory, calculate the SIR by dividing the estimated signal power by the estimated interference power, store the calculated SIR in the memory, compare the calculated SIR with a target SIR, which is stored in the memory, to thereby generate a power control signal, transmit the power control signal from the base station to the mobile phone, and adjust power of the communication signals transmitted by the mobile phone based on the power control signal.

These and other features and aspects of the invention can be better appreciated from the accompanying description of a preferred mode of the invention and drawing figures.

BRIEF DESCRIPTION OF THE DRAWINGS

The foregoing and other features of the present invention will be more readily apparent from the following detailed description and drawings of illustrative embodiments of the invention, in which.

DETAILED DESCRIPTION OF THE PREFERRED MODE OF THE INVENTION

A. System Overview

Figure 1:
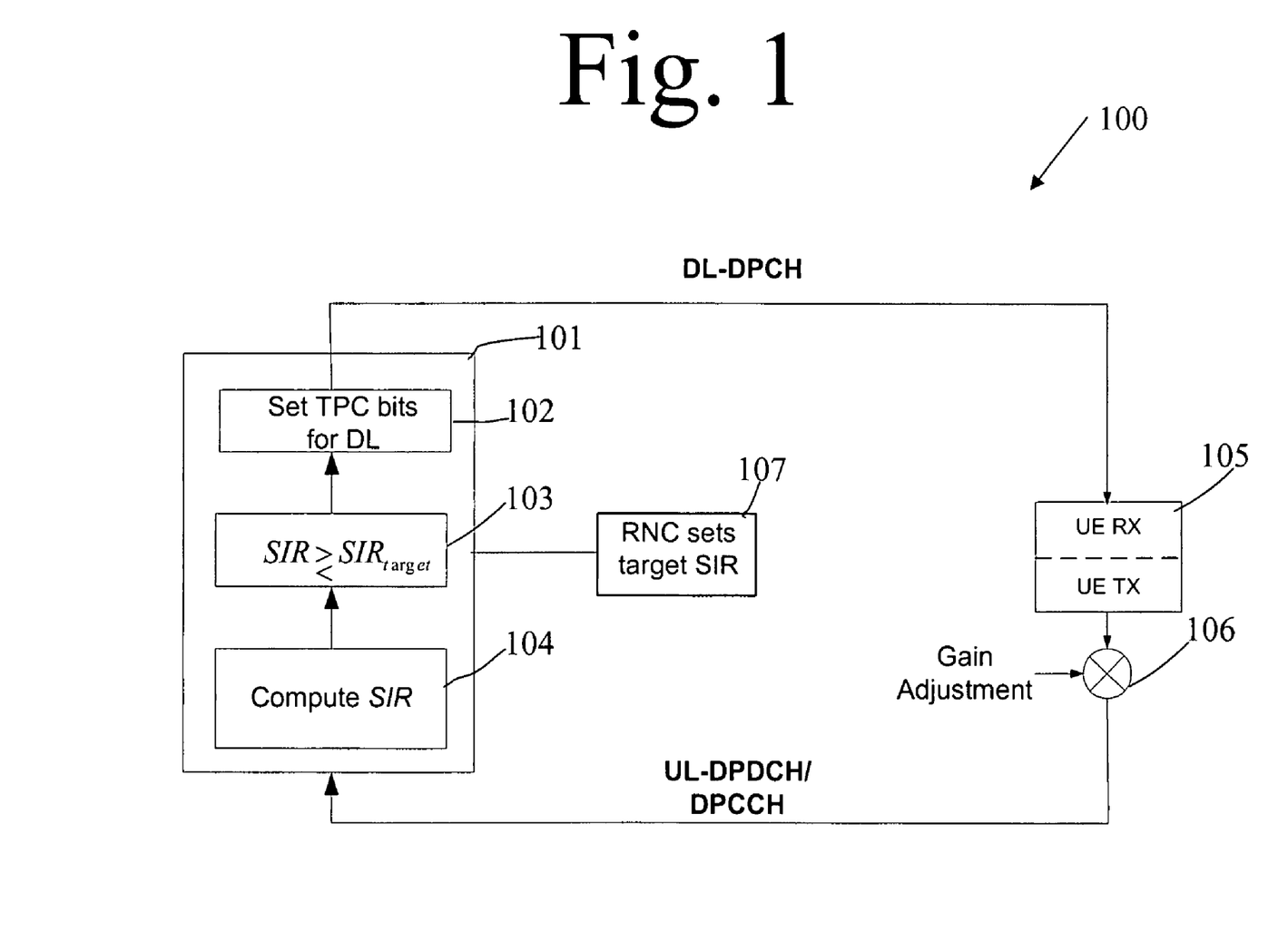
FIG. 1 is a flowchart of closed-loop power control.

FIG. 1 illustrates a flowchart of closed-loop power control in a CDMA system. Base station 101 transmits on a downlink dedicated physical channel (DL-DPCH) to mobile phones (i.e., UE or User Equipment) 105 communication signals, which include power control commands. Each mobile phone 105 includes a receiver (RX), a transmitter (TX), and an amplifier 106. After the receiver (RX) receives the communication signals, the amplifier 106 uses the received power control commands to adjust the power of signals transmitted on an uplink (UL) dedicated physical data channel (DPDCH) and dedicated physical control channel (DPCCH) transmitted by the transmitter (TX) back to the base station 101.

The base station 101 includes a signal-to-interference ratio (SIR) calculator 104, a comparator 103, and a formatter 102. The SIR calculator 104 calculates the SIR of communication signals received from the mobile phone 105. The comparator 103 then compares the calculated SIR with a target SIR to determine whether the base station 101 should transmit power-up or power-down power control commands to the mobile phone 105 that will cause the mobile phone 105 to adjust the power of its transmitted signals to be higher or lower, respectively. After the comparison, the formatter 102 then sets the format of the transmit power control (TPC) bits of the downlink signal to be transmitted from the base station 101 to the mobile phone 105.

The closed-loop power control of FIG. 1 has two loops. A first loop, which is a focus of this invention, consists of the downlink (DL) from the base station 101 to the mobile phone 105 and the uplink (UL) from the mobile phone 105 back to the base station 101; this loop controls the power setting of the mobile phone 105 to transmit at a power such that transmitted signals are received at the base station 101 at a target SIR. The second loop 107 consists of a radio network control (RNC), which uses information from multiple base stations, to set the target signal-to-interference ratio ($SIR_{target}$). The second loop forms no part of the present invention.

Figure 2:
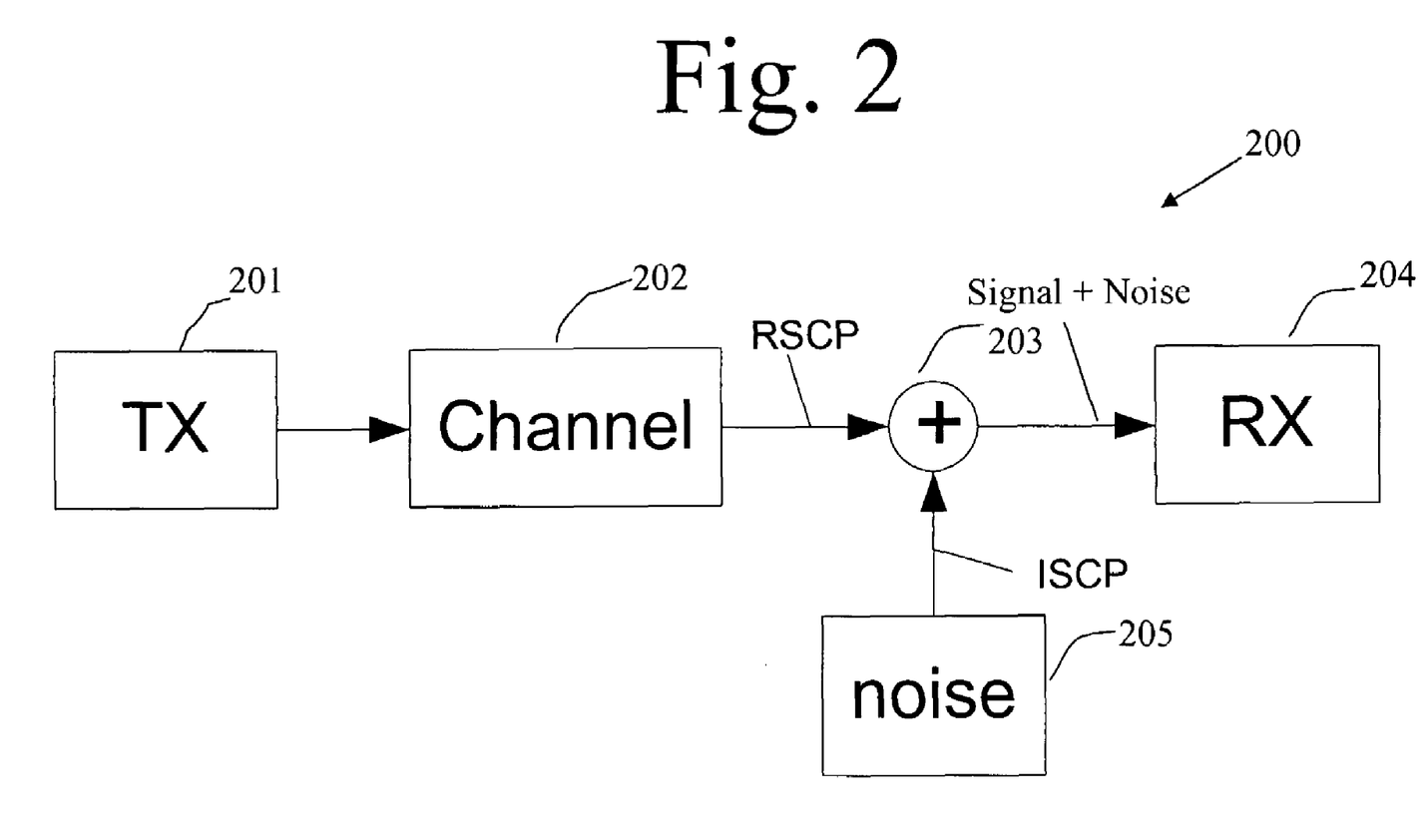
FIG. 2 illustrates an overview of a CDMA system.

FIG. 2 illustrates an overview of a CDMA system 200, which includes a transmitter 201, a communication channel 202 for transmitting CDMA signals, and a receiver modem engine 204. The transmitter 201 transmits over the communication channel 202 communication signals, which consist of received signal code power (RSCP) transmitted via the communication channel 202. The receiver modem engine 204 receives both this RSCP and interference signal code power (ISCP), the later of which consists of thermal noise and interference from mobile phones. In FIG. 2, the noise 205 and adder 203, which combines the RSCP and the ISCP, are schematically modeled as components of the system. In an uplink (UL) portion of the CDMA system, the transmitter 201 is the mobile phone and the receiver modem engine 204 is the base station, and in a downlink (DL) portion the transmitter 201 is the base station and the receiver modem engine 204 is the mobile phone. The SIR estimation described herein is performed at the receiver modem engine 204.

Figure 3:
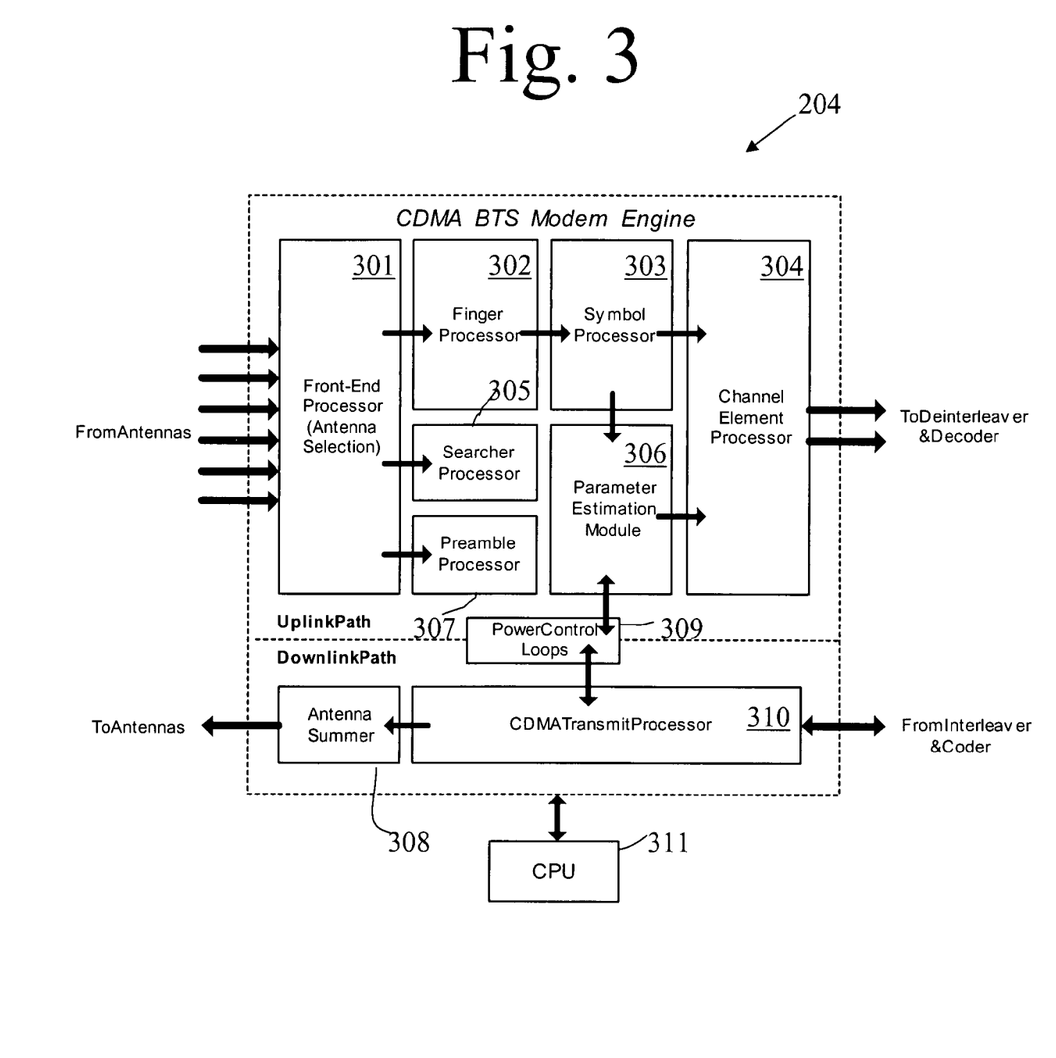
FIG. 3 illustrates an overview functional block diagram of the CDMA receiver of FIG. 2.

FIG. 3 illustrates an overview functional block diagram of the CDMA receiver modem engine 204 having multiple computation units performing various functions with arrows representing signal flow in accordance with a preferred embodiment. Other signal flows are possible. The CDMA receiver modem engine 204 is located between base station antennas (not shown) and a deinterleaver and decoder (also not shown). The general layout from left to right of the CDMA receiver modem engine 204 is indicative of the hierarchy of the operational sequence and flow of a receive-path of communication signals in the communication system. In particular, the receive-path includes front-end processor 301 (for antenna selection), which is coupled to provide data to preamble processor 307. Preamble processor 307 provides synchronization between the transmitter 201 and the receiver modem engine 204, and is coupled to provide data to the searcher processor 305. The searcher processor 305 searches for multipath in order to attach fingers of a RAKE receiver to time offsets. The finger processor 302 then sets up and fine-tunes the RAKE receiver, while the parameter estimator 306 simultaneously estimates the channels and various channel impairments. The symbol processor 303 then symbol processes and demodulates the signals, while the channel element processor outputs soft-symbol data to a deinterleaver and decoder (not shown). A transmit path provides data flow starting with a CDMA transmit processor 310, which processes data with the input of the power control loops 309 and forwards the processed data to antenna summer 308. The CDMA transmit processor 310 coordinates with a CPU 311 to enable the mobile phone to communicate over wideband CDMA. Most of these functions are well known. The parameter estimator 306, which comprises a salient feature of this invention, is described in detail below.

Both the received signal code power (RSCP) and the interface signal code power (ISCP), can be estimated given only the received combined signal plus noise, which are input from the antenna, to arrive at the calculated SIR. SIR is defined as $$SIR = \frac{RSCP}{ISCP} \times SF = \hat{E}_s / \hat{I}_s \tag{1}$$

where SF is the spreading factor on the code channel (DPCCH, described below). RSCP and ISCP are chip-level values, while SIR is a symbol-level value due to multiplication by SF. The SIR estimate is the ratio of two estimates: the signal power estimate $\hat{E}_s$ and the noise plus interference estimate $\hat{I}_s$.

The transmitted signal from the mobile phone 105 to the base station 101 consists of two channels: the UL-DPCCH (uplink dedicated physical control channel) and the UL-DPDCH (uplink dedicated physical data channel). As used herein, uplink refers to the communication path from the mobile phone 105 to the base station 101.

Figure 4:
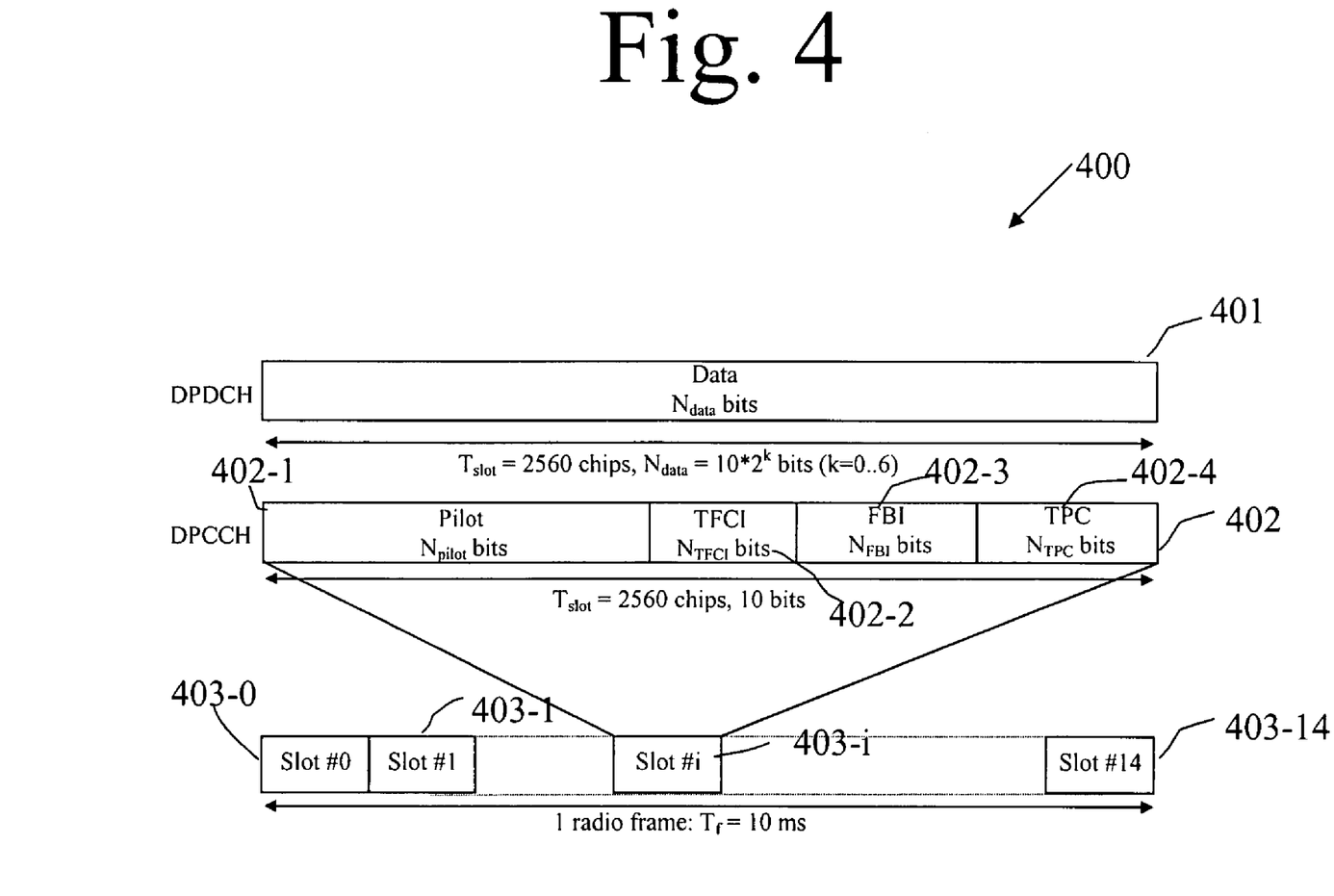
FIG. 4 illustrates frame structure for uplink DPCCH/DPDCH.

FIG. 4 illustrates frame structure 400 for uplink data and control channels. Each frame of the data channel 401 and code channel 402 has a length of 10 ms, which at a chip rate of 3.84 Mchips/s corresponds to 38,400 chips. The frame is divided into 15 slots (403-0 through 403-14) of 666.67 s or 2560 chips, which comprise control bits, as opposed to data bits, wherein one slot is the smallest unit available for issuing power control commands. Such commands are carried in the uplink signals within each slot of a frame. The uplink data channel 401 serves as the dedicated data transport channel while the uplink control channel 402 carries control information for the physical layer. The control channel 402 provides information needed to determine the spreading factor used in the data channel 401 along with other physical layer control information. In the preferred embodiment, the control channel 402 slot always has a spreading factor of 256 and consists of 10 information bits split among known pilot bits 402-1 to support channel estimation, transport format combination indicator (TFCI) bits 402-2, feedback information (FBI) bits 402-3, and transmit power control (TPC) command bits 402-4. The pilot bits 402-1 are synchronization sequences embedded in each slot. The TFCI bits 402-2 inform the base station which transport channels are active in the simultaneously transmitted uplink data channel 401 radio frame and which spreading factor is in use.

B. Signal Energy (RSCP) Estimation

According to a preferred mode of the present invention, signal power is estimated using non-coherent processing. This signal power estimation process introduces a noise-bias, which is subtracted using a noise estimation technique so that this non-coherent RSCP estimation meets the accuracy requirements of 3GPP.

Figure 5:
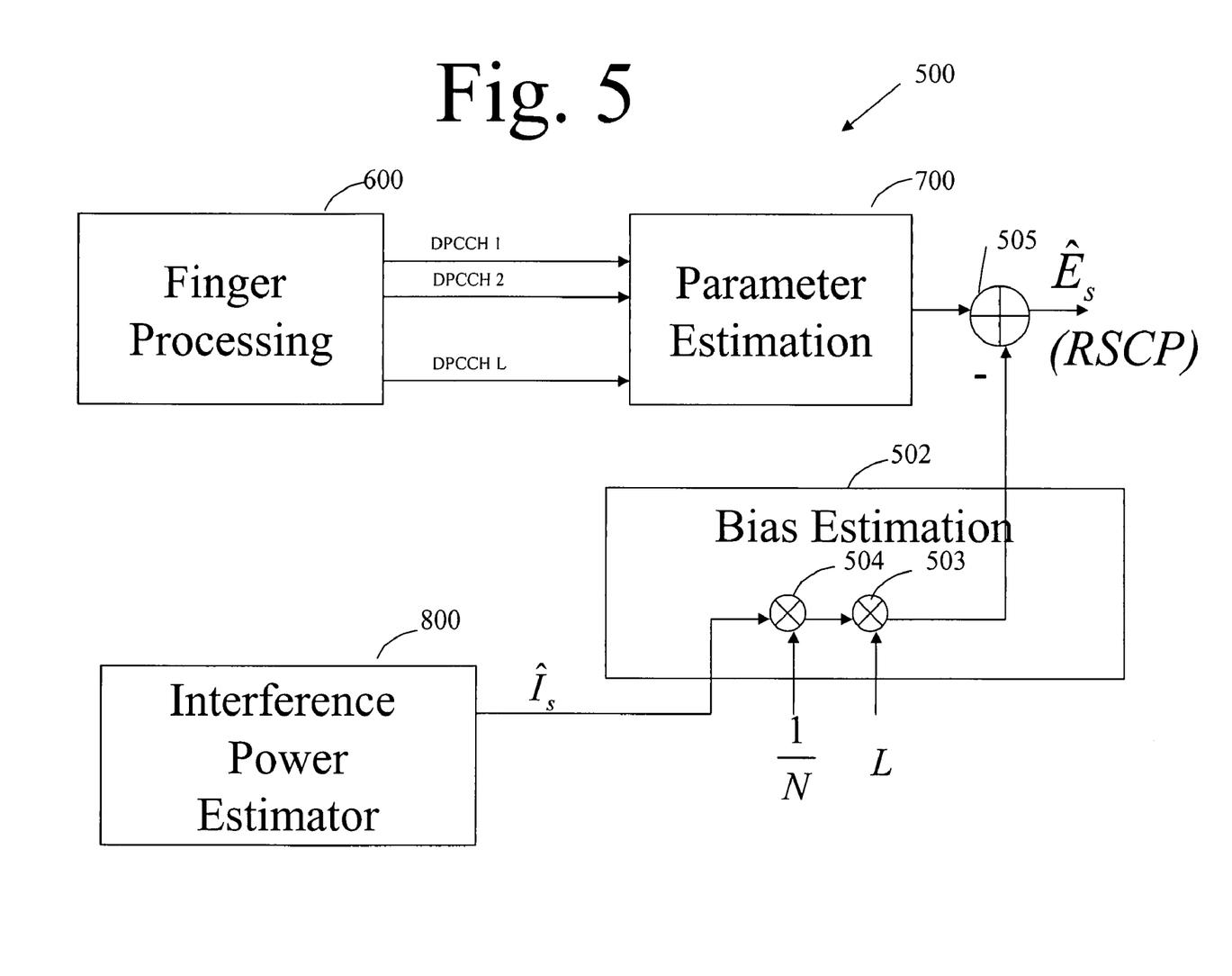
FIG. 5 illustrates a block diagram for non-coherent RSCP estimation in accordance with a preferred mode of the present invention.
Figure 6:
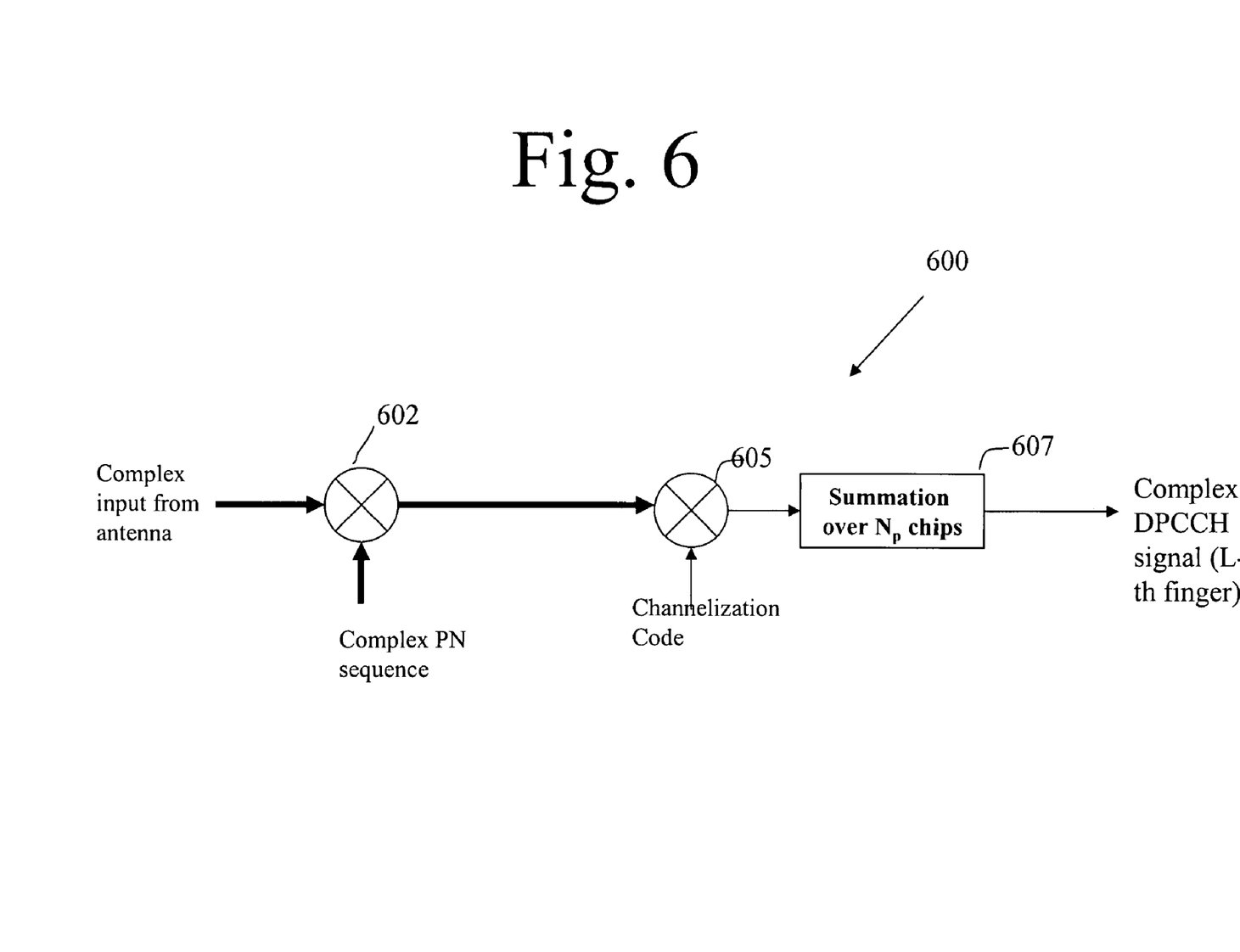
FIG. 6 illustrates a block diagram for finger processing performed by the finger processing block of FIG. 5.
Figure 7:
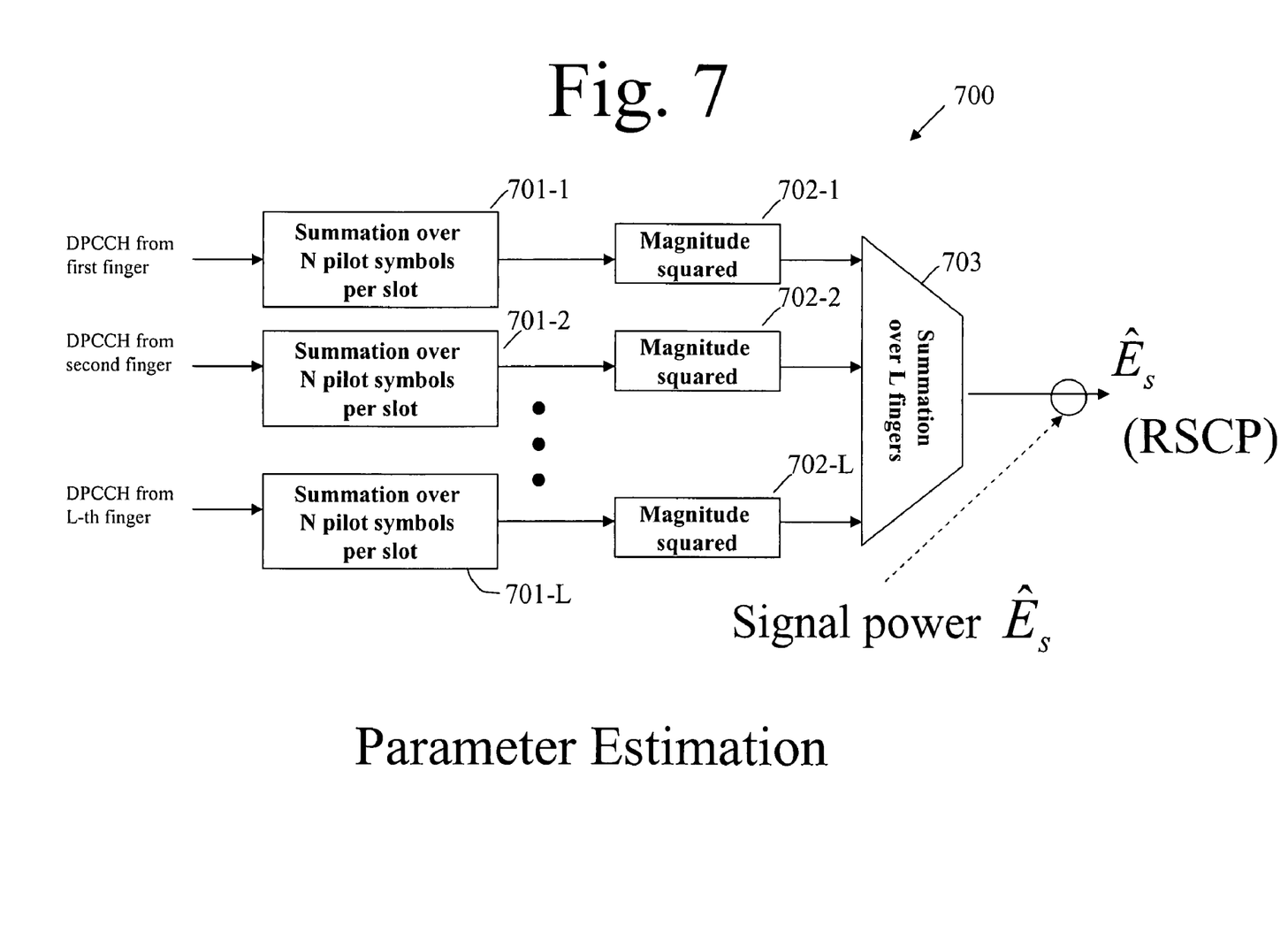
FIG. 7 illustrates a block diagram for parameter estimation performed by the parameter estimation block of FIG. 5.
Figure 8:
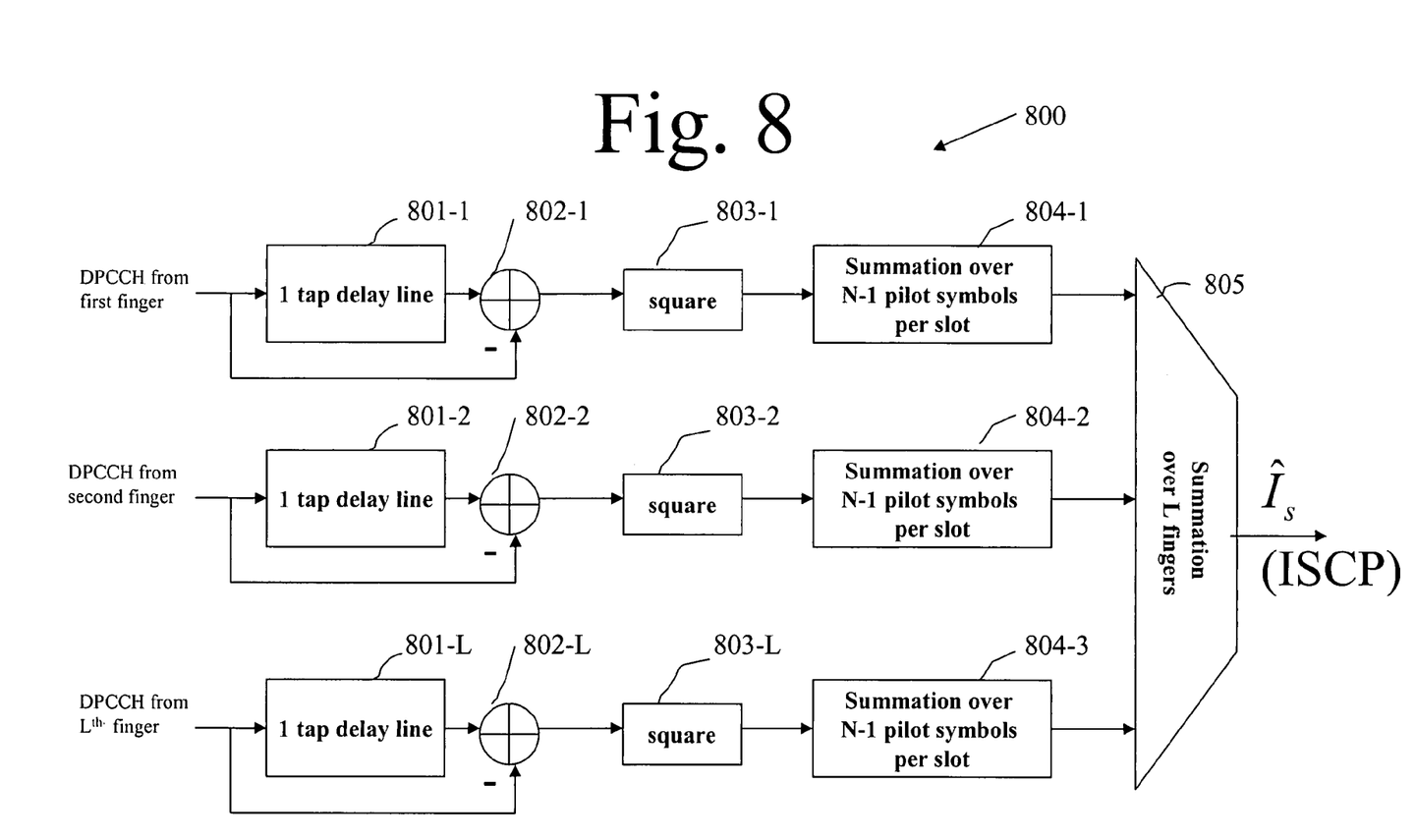
FIG. 8 illustrates a block diagram for interference power estimation performed by the interference power estimation block of FIG. 5.

By way of overview, FIGS. 5-8 illustrate block diagrams of the non-coherent RSCP estimation of a preferred mode of the present invention. FIG. 5 illustrates a block diagram 500 of an overview of the non-coherent RSCP estimation, and FIGS. 6-8 illustrate block diagrams, which are used in the non-coherent RSCP estimation of FIG. 5. More specifically, FIG. 6 illustrates a block diagram 600 for finger processing, FIG. 7 illustrates a block diagram 700 for parameter estimation, and FIG. 8 illustrates a block diagram 800 for estimating interference power.

With further reference to FIG. 5, the finger processing block 600 outputs finger data symbols for the control channels (DPCCH) for each of the fingers 1 through L of the RAKE receiver. These symbols are input to a parameter estimation block 700, which computes RSCP. Finger energies, and energy in general, relate directly to finger power and power in general.

Simultaneously, bias is estimated using estimated interference power. More specifically, interference power estimator block 800 estimates an interference power $\hat{I}_s$, which is used by bias estimation block 502 to estimate the bias. Subtractor 505 subtracts the bias, which is output from the bias estimation block 502, from the output of the parameter estimation block 700 to produce a signal power estimate $\hat{E}_s$ (or RSCP).

Now reiterating this process in mathematical terms, the following notation is used:
L: number of locked fingers;
$N_p$: number of chips per pilot symbol;
SF=$N_p$=256;
$E_c$: chip energy;
N: number of pilot symbols in a DPCCH slot;
$c_{i,l}$: fading channel coefficient for the $l^{th}$ finger;
$N_o$: noise plus interference variance; and
$x_i$: DPCCH control data bit.

By examining the inner term in Equation (9), which represents estimated signal energy and is described below with respect to the parameter estimation block 700 of FIG. 7, yields $$\hat{E}_s = \sum_{l=1}^{L} \left\| \frac{1}{N} \sum_{i=1}^{N} y_{i,l} x_i^* \right\|^2 \tag{2}$$

Examining the inner term in Equation (2), yields $$E_{s,l} = \frac{1}{N^2} \left\| N_p A_p \sqrt{E_c} \sum_{i=1}^{N} c_{i,l} + \sum_{i=1}^{N} v_{i,l} \right\|^2. \tag{3}$$

Let $c_{i,l} = c_{s,l}$, $\forall i=1, 2, \ldots, N$, then $$E_{s,l} = N_p^2 A_p^2 E_c \|c_{s,l}\|^2 + \|u_{s,l}\|^2 \tag{4}$$

where $$u_{s,l} = \frac{1}{N} \sum_{i=1}^{N} v_{i,l}$$

is zero-mean with variance $N_p N_o$. Mean energy estimate is provided by $$E[E_{s,l}] = N_p^2 A_p^2 E_c \|c_l\|^2 + \frac{N_p N_o}{N}. \tag{5}$$

The mean energy estimate across all fingers is provided by $$E[\hat{E}_s] = N_p^2 A_p^2 E_c \sum_{l=1}^{L} \|c_l\|^2 + \frac{L N_p N_o}{N}. \tag{6}$$

Note that the second term in Equation (6), represents a bias that depends on the noise/interference. This bias can be removed using an estimate of the interference as follows $$\hat{E}_s' = \hat{E}_s - L\hat{I}_s/N \tag{7}$$

It is assumed that software or hardware can provide the inputs L, N, $N_p$, and $N_o$. Again, signal energy relates, mathematically, to signal power by a constant scaler.

FIG. 6 illustrates a block diagram showing details of the finger processing performed by the finger processor 302 shown in FIG. 3 and also the finger processing block 600 shown in FIG. 5. Complex signals arrive at the finger processor 302 from the antennas. The complex signals are correlated with a pseudo noise (PN) sequence at correlator 602 in order to separate signals of different mobile phones 105. Multiplier 605 multiplies the output of correlator 602 with a channelization code. Summer 607 then sums the output of multiplier 605 of $N_p$ chips to produce complex code channel (DPCCH) symbols for the $l^{th}$ finger. The despread code channel signal on the $l^{th}$ finger is provided by the following Equation (8).

$$y_{i,l} = N_p A_p \sqrt{E_c} c_{i,l} x_i + v_{i,l} \quad (8)$$

where l=1, 2, . . . , L, i=1, 2, . . . , N, and $v_{i,l}$ is the contribution due to noise and interference which is modeled as zero mean and variance $\sigma_v^2 = N_p N_o$.

FIG. 7 illustrates a block diagram 700 for parameter estimation, which is used in the non-coherent RSCP estimation of FIG. 5. For each finger, first through L, the symbols of the control channel (DPCCH) are input to summer 701, which calculate a summation over N pilot symbols per slot. That is, the estimated parameter energy is calculated by using the summation block 701 taking the magnitude of the slot average signal $$\left( i.e., r_{s,l} = \sum_{i=1}^{N} y_{i,l} x_i^* = N_p A_p \sqrt{E_c} \sum_{i=1}^{N} c_{i,l} + \sum_{i=1}^{N} v_{i,l} \right)$$

for each of the fingers first through L, and then in multiplier 702 squaring each of the magnitudes. Finally, summer 703 sums the squared magnitudes from multipliers 702-1 through 702-L for each of the fingers, to produce the estimated signal energy (and hence, power). That is, estimating the signal energy in this case is provided by $$\hat{E}_s = \sum_{l=1}^{L} \left\| \frac{1}{N} \sum_{i=1}^{N} y_{i,l} x_i^* \right\|^2. \quad (9)$$

The signal energy estimate can be improved by additionally using the other despread symbols on the code channel (i.e., TPC, TFCI and FBI). That is, the signal power estimate can be improve by using the pilot symbols in combination with any one of more of the TPC, TFCI, and FBI.

C. Interference Power (ISCP) Estimation

FIG. 8 illustrates a block diagram 800 for estimating interference power by using the squared difference between adjacent pilot symbols. Thus for each finger, first through L, a 1-tap delay line 801 is used to delay one symbol so that the delayed symbol and the current symbol can be compared at comparator 802. Alternatively, for each finger, first through L, a high-pass filter can replace of the 1-tap delay line 801 and the comparator 802. The result is then squared at squaring block 803, and the squared results are summed by summer 804 over N−1 pilot symbols per slot. Finally a summer 805 sums the results from summers 804-1 through 804-L of first through Lth fingers, respectively, to produce the estimated interference signal.

Reiterating this process in purely mathematical terms, examining the squared difference between adjacent pilot symbols the interference power estimate is provided by $$\hat{I}_s = \frac{1}{2(N-1)L} \sum_{l=1}^{L} \sum_{i=1}^{N-1} (y_{i,l} x_i^* - y_{i+1,l} x_{i+1}^*)^2. \quad (10)$$

The estimator in Equation (10) averages the interference power estimate across all the locked fingers. The interference power estimate can be improved by using the pilot symbols in combination with the TPC sysmbols.

While the invention has been described in detail with particular reference to certain embodiments thereof, the invention is capable of other and different embodiments, and its details are capable of modifications in various obvious respects. As would be readily apparent to those skilled in the art, variations and modifications can be affected while remaining within the spirit and scope of the invention. Accordingly, the foregoing disclosure, description, and drawing figures are for illustrative purposes only, and do not in any way limit the invention, which is defined only by the claims.

What is claimed is:

1. A method for calculating signal-to-interference ratio (SIR) of a mobile device in a wireless communication system, the method comprisng:
   processing a communication signal transmitted by the mobile device to obtain a total power estimate of combined signal plus noise, the step of processing including calculating a slot energy signal using a number of signal values of the communication signal and a number of pilot symbols;
   estimating interference power of the communication signal, the step of estimating including examining squared differences between values relating to adjacent pilot symbols;
   scaling the estimated interference power and/or the total power estimate;
   subtracting the estimated interference power or the scaled estimated interference power from the total power estimate or the scaled total power estimate to thereby estimate signal power; and
   calculating the SIR by dividing the estimated signal power by the estimated interference power.

2. The method of claim 1, wherein the step of processing includes:
   multiplying a portion of the communication signal by a pilot symbol sequence in each finger of a receiver to produce a respective multiplied signal;
   calculating an average of the multiplied signal over a length of the pilot symbol sequence in each of the fingers of the receiver;
   squaring the respective averages in the fingers of the receiver; and
   adding the squares of the fingers of the receiver.

3. The method of claim 1, wherein signal power is estimated based on pilot symbols and any one or more of TPC, TFCI, and FBI symbols.

4. The method of claim 1, wherein the interference power is estimated based on pilot symbols and TPC symbols.

5. The method of claim 1, wherein the step of estimating the interference power includes a step of calculating a difference between values relating to adjacent symbols.

6. The method of claim 5, wherein the step of estimating the interference power includes a step of calculating a square of the difference between values relating to adjacent symbols.

7. The method of claim 5, wherein the step of estimating the interference power includes a step of high-pass filtering symbols.

8. The method of claim 1, wherein the step of estimating includes multiplying a number of signal values of the communication signal by a number of conjugate complex pilot symbols, and summing multiplication results to obtain a multiplication result sum.

9. The method of claim 8, wherein the step of estimating includes multiplying a number of signal values of the communication signal by a number of conjugate complex pilot symbols, calculating differences between multiplication results having a neighboring pilot symbol index, and summing squared differences to obtain a difference sum, and
wherein the step of scaling is performed so that the multiplication result sum and the difference sum are related to the same number of pilot symbols.

10. The method of claim 1, wherein the step of estimating includes multiplying a number of signal values of the communication signal by a number of conjugate complex pilot symbols, calculating differences between multiplication results having a neighboring pilot symbol index, and summing squared differences to obtain a difference sum.

11. The method of claim 1, wherein the step of processing includes using the following equation:

$$\hat{E}_s = \sum_{l=1}^{L} \left\| \frac{1}{N} \sum_{i=1}^{N} y_{i,l} x_i^* \right\|^2,$$

wherein $\hat{E}_s$ is the total power estimate, $x_i$ is a pilot symbol, $y_{i,l}$ is a value of the communication signal, N is the number of pilot symbols, and L is the number of locked fingers of a finger receiver.

12. The method of claim 1, wherein the step of estimating interference power includes using the following equation:

$$\hat{I}_s = \frac{1}{2(N-1)L} \sum_{l=1}^{L} \sum_{i=1}^{N-1} (y_{i,l} x_i^* - y_{i+1,l} x_{i+1}^*)^2,$$

wherein $\hat{I}_s$ is the interference power, $x_i$ is a pilot symbol, $y_{i,l}$ is a value of the communication signal, $x_{i+1}$ is a neighboring pilot symbol, $y_{i,l+1}$ is a neighboring value of the communication signal, N is the number of pilot symbols, and L is the number of locked fingers of a finger receiver.

13. In a wireless communication system having a base station and a mobile device, a method for adjusting power settings of the mobile device comprising:
calculating signal-to-interference ratio (SIR) of communication signals transmitted to the base station by the mobile device, the calculating step including:
processing a communication signal transmitted by the mobile device, to obtain a total power estimate of combined signal plus noise, the step of processing including calculating a slot energy signal using a number of signal values of the communication signal and a number of pilot symbols;
estimating interference power of the communication signal, the step of estimating including examining squared differences between values relating to adjacent pilot symbols;
scaling the estimated interference power and/or the total power estimate;
subtracting the estimated interference power or the scaled estimated interference power from the total power estimate or the scaled total power estimate to thereby estimate signal power; and
calculating the SIR by dividing the estimated signal power by the estimated interference power;
comparing the calculated SIR with a target SIR to thereby generate a power control signal;
transmitting the power control signal from the base station to the mobile phone; and
adjusting the power of the communication signals transmitted by the mobile phone based on the power control signal.

14. The system of claim 13, wherein signal power is estimated based on pilot symbols and any one or more of TPC, TFCI, and FBI symbols.

15. The system of claim 8, wherein the interference power is estimated based on pilot symbols and TPC symbols.

16. The system of claim 13, wherein the step of estimating the interference power includes a step of calculating a difference between values relating to adjacent symbols.

17. The system of claim 16, wherein the step of estimating the interference power includes a step of calculating a square of the difference between values relating to adjacent symbols.

18. A system for calculating signal-to-interference ratio (SIR) comprising:
means for processing a communication signal transmitted by the mobile device to obtain a total power estimate of combined signal plus noise, the step of processing including calculating a slot energy signal using a number of signal values of the communication signal and a number of pilot symbols;
means for estimating interference power of the communication signal including examining squared differences between values relating to adjacent pilot symbols;
means for scaling the estimated interference power and/or the total power estimate;
means for subtracting the estimated interference power or the scaled estimated interference power from the total power estimate or the scaled total power estimate to thereby estimate signal power; and
means for calculating the SIR by dividing the estimated signal power by the estimated interference power.

19. The system of claim 18, wherein the means for processing comprises:
means for multiplying a portion of the communication signal by a pilot symbol sequence in each finger of a receiver to produce a respective multiplied signal;
means for calculating an average of the multiplied signal over a length of the pilot symbol sequence in each of the fingers of the receiver;
means for squaring the respective averages in the fingers of the receiver; and
means for adding the squares of the fingers of the receiver.

20. The system of claim 18, wherein signal power is estimated based on pilot symbols and any one or more of TPC, TFCI, and FBI symbols.

21. The system of claim 18, wherein the interference power is estimated based on pilot symbols and TPC symbols.

22. The system of claim 18, wherein the means for estimating the interference power is communicatively coupled with a means for calculating a difference between values relating to adjacent symbols.

23. The system of claim 22, wherein the means for estimating the interference power is communicatively coupled with a means for calculating a square of the difference between values relating to adjacent symbols.

24. A wireless communication system, having a base station and a mobile device, for providing power control of communication signals transmitted by the mobile device comprising:
    means for calculating signal-to-interference ratio (SIR) of the communication signals transmitted to the base station by the mobile device, the calculating means comprising:
        means for processing a communication signal transmitted by the mobile device to obtain a total power estimate of combined signal plus noise, the step of processing including calculating a slot energy signal using a number of signal values of the communication signal and a number of pilot symbols;
        means for estimating interference power of the communication signal including examining squared differences between values relating to adjacent pilot symbols;
        means for calculating a scaled estimated interference power and/or a scaled total power estimate;
        means for subtracting the estimated interference power or the scaled estimated interference power from the total power estimate or the scaled total power estimate to thereby estimate signal power; and
        means for calculating the SIR by dividing the estimated signal power by the estimated interference power;
    means for comparing the calculated SIR with a target SIR to thereby generate power control signals;
    means for transmitting the power control signals from the base station to the mobile phone; and
    means for adjusting power of the communication signals transmitted by the mobile phone based on the power control signals.

25. The system of claim 24, wherein signal power is estimated based on pilot symbols and any one or more of TPC, TFCI, and FBI symbols.

26. The system of claim 24, wherein the interference power is estimated based on pilot symbols and TPC symbols.

27. A wireless communication system having a base station and a mobile device, comprising:
    a processor;
    a memory communicatively coupled to the processor;
    software executing in the processor configured to:
        process a communication signal transmitted by the mobile device to obtain a total power estimate of combined signal plus noise, the step of processing including calculating a slot energy signal using a number of signal values of the communication signal and a number of pilot symbols;
        store the processed communication signal in the memory;
        estimate interference power of the communication signal, including examining squared differences between values relating to adjacent pilot symbols;
        store the estimated interference power in the memory;
        scale the estimated interference power and/or the total power estimate;
        store the scaled estimated interference power;
        subtract the estimated interference power or the scaled estimated interference power from the total power estimate or the scaled total power estimate to thereby estimate signal power;
        store the scaled estimated signal power in the memory; and
        calculate the SIR by dividing the estimated signal power by the estimated interference power.

28. A wireless communication system having a base station and a mobile device, comprising:
    a processor;
    a memory communicatively coupled to the processor;
    software executing in the processor configured to:
        process a communication signal transmitted by the mobile device to obtain a total power estimate of combined signal plus noise, the step of processing including calculating a slot energy signal using a number of signal values of the communication signal and a number of pilot symbols;
        store the processed communication signal in the memory;
        estimate interference power of the communication signal including examining squared differences between values relating to adjacent pilot symbols;
        store the estimated interference power in the memory;
        scale the estimated interference power and/or the total power estimate;
        store the estimated interference power or the scaled estimated interference power;
        subtract the scaled estimated interference power from the total power estimate or the scaled total power estimate to thereby estimate signal power;
        store the estimated signal power in the memory; and
        calculate the SIR by dividing the estimated signal power by the estimated interference power;
        store the calculated SIR in the memory;
        compare the calculated SIR with a target SIR, which is stored in the memory, to thereby generate a power control signal;
        transmit the power control signal from the base station to the mobile phone; and
        adjust power of the communication signals transmitted by the mobile phone based on the power control signal.

29. A method for calculating signal-to-interference ratio (SIR) of a mobile device in a wireless communication system, the method comprising the steps of:
    non-coherently processing a communication signal transmitted by the mobile device;
    estimating interference power of the communication signal;
    scaling the estimated interference power or the processed communication signal;
    subtracting the estimated interference power or the scaled estimated interference power from the processed communication signal or scaled processed communication signal to thereby estimate signal power; and
    calculating the SIR by dividing the estimated signal power by the estimated interference power,
    wherein the step of non-coherently processing includes the steps of:
        multiplying a portion of the communication signal by a pilot symbol sequence in each finger of a receiver to produce a respective multiplied signal;

calculating an average of the multiplied signal over a length of the pilot symbol sequence in each of the fingers of the receiver;

squaring the respective averages in the fingers of the receiver; and adding the squares of the fingers of the receiver.

30. A system for calculating signal-to-interference ratio (SIR) comprising:

means for non-coherently processing a communication signal transmitted by the mobile device;

means for estimating interference power of the communication signal;

means for scaling the estimated interference power or the processed communication signal;

means for subtracting the estimated interference power or the scaled estimated interference power from the processed communication signal or scaled processed communication signal to thereby estimate signal power; and means for calculating the SIR by dividing the estimated signal power by the estimated interference power, wherein the means for non-coherently processing comprises:

means for multiplying a portion of the communication signal by a pilot symbol sequence in each finger of a receiver to produce a respective multiplied signal;

means for calculating an average of the multiplied signal over a length of the pilot symbol sequence in each of the fingers of the receiver;

means for squaring the respective averages in the fingers of the receiver; and means for adding the squares of the fingers of the receiver.

* * * * *